UNITED STATES PATENT OFFICE.

VICTOR STOBIE, OF SHEFFIELD, ENGLAND.

METHOD OF IMPROVING PIG-IRON.

1,093,892.  Specification of Letters Patent.  Patented Apr. 21, 1914.

No Drawing.  Application filed July 7, 1913. Serial No. 777,778.

*To all whom it may concern:*

Be it known that I, Victor Stobie, a subject of the King of Great Britain and Ireland, and residing at Foster's Buildings, High street, Sheffield, in the county of York, England, have invented a certain new and useful Method of Improving Pig-Iron, of which the following is a specification.

The present invention has for its object to provide a method for improving the quality of pig iron by modifying undesired physical properties without appreciable change of its chemical constitution beyond liberating oxygen present in the bath.

The difference in toughness, grain and chilling property between cold-blast iron and hot-blast iron is considered to be mainly due to the drastic treatment to which the material is subjected by the hot-blast method leaving substantial quantities of gases in the product, whereas the slower cold-blast process allows more natural reactions to take place in the furnace and avoids deterioration of the iron by dissolved gases. This effect of gases in iron may further be appreciated by comparing the respective toughnesses of steels of identical chemical composition made by the Bessemer and open hearth processes; the steel made by the latter process exceeding in toughness that made by the former process for the reason that the Bessemer process is a quick and drastic process and the open hearth process a much slower one.

According to the present invention in its preferred form I improve the physical properties of pig iron by maintaining it for a certain period of time in a molten condition in an electric furnace and keeping it covered with a layer of slag, while during a portion of the time the bath is agitated by carbon dioxid evolved by limestone added to the bath. Thus I may carry out my invention as follows:—

The metal is introduced into an electric furnace preferably direct from the hot blast-furnace, care being taken that no slag enters along with the iron. A slag composed of, say, 60% of lime and 40% of silica is thrown on the metal and the current switched on. The slag, when molten, must be kept free from the oxid of iron, which rises from the bath, by additions to the slag of carbon, ferro-silicon or other deoxidant, in the usual manner. Lumps of limestone are thrown into the bath so that the violent evolution of carbonic acid which escapes from the limestone under the influence of heat will mechanically and vigorously stir the metal and increase the interaction between the bath and the slag. The metal should then be allowed to rest under the slag. This treatment gives a product which is very tough and close grained, resembling in practice cold-blast iron. If considerable limestone is added, *i. e.*, much more than is necessary for mechanical stirring, I find the bath is partially desiliconized, demanganated and dephosphorized; therefore care should be taken to limit the limestone additions to the proper quantity required effectively to agitate the metal bath. Should it be desirable to reduce the silicon, manganese and phosphorus content of the metal, iron oxid added in the usual way for steel dephosphorizing will be found more efficient for this purpose; care being taken to limit the addition of iron oxid so that the product is a pig iron and to finish the treatment by the method above described.

Hematite iron may be treated as above in a dolomite lined furnace as well as phosphoric iron, as the silicon in such metal is not slagged out.

Having now described my invention what I claim as new and desire to secure by Letters Patent is:—

1. The method of treating molten iron which comprises covering the same with a reacting slag and causing mechanical agitation of the contacting surfaces of iron and slag by the evolution of a neutral gas at said contacting surfaces.

2. The method of improving the physical properties of blast-furnace pig iron which comprises covering a body of molten pig iron with a layer of refining slag, liberating a neutral gas from a compound containing the same in contact with said slag and iron, and agitating the contacting surfaces of said iron and slag by the liberation of said neutral gas.

3. A method of improving the properties of blast-furnace pig iron, comprising covering a body of molten pig iron with molten slag, and vigorously agitating the contacting surfaces of said pig iron and slag by carbon-dioxid generated adjacent the contacting surfaces of said iron and slag.

4. A method of improving the properties of blast-furnace pig iron, comprising covering a body of molten pig iron with a layer of molten refining slag, adding sufficient limestone to said slag to evolve enough carbon-dioxid by the heat of said slag and iron to cause vigorous mechanical stirring of the contacting surfaces of said iron and slag.

5. A method of improving the quality of blast furnace pig iron consisting in maintaining it in a molten condition while covered with a slag of more or less equal portions of lime and silica and maintaining said slag free of iron by addition of a deoxidant; as set forth.

6. A method of improving the physical properties of hot blast pig iron consisting in maintaining it while covered with a lime silica slag in a molten condition in an electric furnace, maintaining the slag iron free by additions of deoxidant, and maintaining the bath in agitation by an addition of limestone during a portion of the time during which it is kept molten; as set forth.

In testimony whereof I have signed my name to this specification in the presence of two subscribing witnesses.

VICTOR STOBIE.

Witnesses:
V. C. FAULKNER,
E. G. PEPPER.